US010882790B2

(12) United States Patent
Yang et al.

(10) Patent No.: US 10,882,790 B2
(45) Date of Patent: Jan. 5, 2021

(54) ENGINEERED SELF-CLEANING CEMENTITIOUS COMPOSITES

(71) Applicant: Nanyang Technological University, Singapore (SG)

(72) Inventors: En-hua Yang, Singapore (SG); Aiqin Zhao, Singapore (SG)

(73) Assignee: Nanyang Technological University, Singapore (SG)

( * ) Notice: Subject to any disclaimer, the term of this patent is extended or adjusted under 35 U.S.C. 154(b) by 101 days.

(21) Appl. No.: 15/524,132

(22) PCT Filed: Nov. 3, 2015

(86) PCT No.: PCT/SG2015/050430
§ 371 (c)(1),
(2) Date: May 3, 2017

(87) PCT Pub. No.: WO2016/072937
PCT Pub. Date: May 12, 2016

(65) Prior Publication Data
US 2017/0334781 A1 Nov. 23, 2017

(30) Foreign Application Priority Data
Nov. 3, 2014 (SG) .............................. 10201407179T (51) Int. Cl.
*C04B 28/04* (2006.01)
*C04B 28/06* (2006.01)
*C04B 28/34* (2006.01)
*C04B 111/20* (2006.01)

(52) U.S. Cl.
CPC .............. *C04B 28/04* (2013.01); *C04B 28/06* (2013.01); *C04B 28/34* (2013.01); *C04B 2111/2061* (2013.01)

(58) Field of Classification Search
CPC ......... C04B 28/04; C04B 28/06; C04B 28/34; C04B 2111/2061
See application file for complete search history.

(56) References Cited

U.S. PATENT DOCUMENTS

| 5,891,374 | A | 4/1999 | Shah et al. |
| 6,117,229 | A | 9/2000 | Cassar et al. |
| 6,803,077 | B2 | 10/2004 | Yu |
| 8,317,917 | B2 | 11/2012 | Arockiadoss |
| 8,367,579 | B2 | 2/2013 | Gensler et al. |
| 2002/0157573 | A1 | 10/2002 | Pellett |
| 2006/0014050 | A1* | 1/2006 | Gueneau ................ B01J 21/063 428/702 |

FOREIGN PATENT DOCUMENTS

| CN | 101704641 A | 5/2010 |
| CN | 102633481 A * | 8/2012 |
| CN | 102776993 A | 11/2012 |
| CN | 103833285 A * | 6/2014 |
| CN | 104129951 A | 11/2014 |
| JP | 9-227203 A | 9/1997 |
| JP | 09227203 A * | 9/1997 |
| KR | 20010087807 A * | 9/2001 |
| WO | 99/58468 A1 | 11/1999 |
| WO | 2013/020972 A2 | 2/2013 |

OTHER PUBLICATIONS

Akiba et al., "Antifungal Effects of a Tissue Conditioner Coating Agent with $TiO_2$ Photocatalyst," *J Med Dent Sci* 52:223-227, 2005.
Awadalla et al., "Titanium dioxide as photocatalyses to create self cleaning concrete and improve indoor air quality," *International Journal of the Physical Sciences* 6(29):6767-6774, 2011.
Cassar et al., "White Cement for Architectural Concrete, Possessing Photocatalytic Properties," $11^{th}$ *Int. Congr. on the Chemistry of Cement*, Durban, 2003, 11 pages.
Charkraborty et al., "Effect of Jute as Fiber Reinforcement Controlling the Hydration Characteristics of Cement Matrix," *Ind. Eng. Chem. Res.* 52:1252-1260, 2013.
Chen et al., "Hydration and properties of nano-$TiO_2$ blended cement composites," *Cement & Concrete Composites* 34:642-649, 2012.
Feng et al., "Portland Cement Paste Modified by $TiO_2$ Nanoparticles: A Microstructure Perspective," *Ind. Eng. Chem. Res.* 52:11575-11582, 2013.
Folli et al., "Photocatalytic cement: influence of $TiO_2$ particle size on photocatalytic performances," $8^{th}$ *fib PhD Symposium in Kgs. Lyngby*, Denmark, 2010, 7 pages.
Folli et al., "Rhodamine B Discolouration in $TiO_2$ in the Cement Environment: A Look at Fundamental Aspects of the Self-cleaning Effect in Concretes," *J. Adv. Oxid. Technol.* 12(1):126-133, 2009.
Katz et al., "A special technique for determining the bond strength of micro-fibres in cement matrix by pullout test," *Journal of Materials Science Letters* 15:1821-1823, 1996.
Li et al., "Conditions for pseudo strain-hardening in fiber reinforced brittle matrix composites," *Appl Mech Rev* 45(8): 390-398, 1992.
Li, "Engineered Cementitious Composites (ECC)—Tailored Composites Through Micromechanical Modeling," *Journal of Advanced Concrete Technology* 1(3):215-230, 2003. (38 pages).
Li et al., "Interface Tailoring for Strain-Hardening Polyvinyl Alcohol—Engineered Cementitious Composite (PVA-ECC)," *ACI Materials Journal* 99(5):463-472, 2002.
Li, "Postcrack Scaling Relations for Fiber Reinforced Cementitious Composites," *J. Mater. Civ. Eng.* 4(1):41-57, 1992.

(Continued)

*Primary Examiner* — Anthony J Green
(74) *Attorney, Agent, or Firm* — Seed IP Law Group LLP (57) ABSTRACT

The present invention relates to a cementitous composite specifically engineered to possess self-cleaning abilities while maintaining their unique strain-hardening behaviour and the preparation of the said composite. The cementitious composite comprises a hydraulic cement, a plurality of fibers, in particular polyvinyl alcohol fibers wherein the ratio of the plurality of fibers to the hydraulic cement is in a range from 1 to 3% by volume; a self-cleaning agent, in particular nanoparticulate titanium dioxide ($TiO_2$) wherein the weight ratio of the self-cleaning agent to the hydraulic cement is in a range from 0.01 to 1.

20 Claims, 5 Drawing Sheets

(56) References Cited

OTHER PUBLICATIONS

Li et al., "Rheology, fiber dispersion, and robust properties of Engineered Cementitious Composites," *Materials and Structures* 46:405-420, 2013.
Li et al., "Tensile Strain-Hardening Behavior of Polyvinyl Alcohol Engineered Cementitious Composite (PVA-ESS)," *ACI Materials Journal* 98(6):483-492, 2001.
Lin et al., "On interface property characterization and performance of fiber-reinforced cementitious composites," *Concrete Science and Engineering* 1:173-184, 1999, 13 pages.
Marshall et al., "A J-Integral Method for Calculating Steady-State Matrix Cracking Stresses in Composites," *Mechanics of Materials* 7: 127-133, 1988.
Nazari et al., "Assessment of the effects of the cement paste composite in presence $TiO_2$ nanoparticles," *Journal of American Science* 6(4):43-46, 2010.
Rattanakam et al., "Visible-light-sensitive N-doped $TiO_2$ photocatalysts prepared by a mechanochemical method: effect of a nitrogen source," *Res Chem Intermed* 35:263-269, 2009.
Zhao et al., "Self-cleaning engineered cementitious composites," *Cement and Concrete Composites* 64:74-83, 2015.

\* cited by examiner

ENGINEERED SELF-CLEANING CEMENTITIOUS COMPOSITES

CROSS-REFERENCE TO RELATED APPLICATION

This application claims the benefit of priority of Singapore Patent Application No. 10201407179T, filed Nov. 3, 2014, the contents of which being hereby incorporated by reference in its entirety for all purposes.

TECHNICAL FIELD

The invention relates generally to cementitious composites. In particular, the cementitious composites are specifically engineered to possess self-cleaning abilities while maintaining their unique tensile strain-hardening behavior.

BACKGROUND

One major weakness of concrete is the lack of ductility. Many infrastructure deterioration problems and failures can be traced back to the cracking and brittle nature of concrete. While the fracture toughness of concrete is significantly improved by fiber reinforcement, most fiber-reinforced concrete (FRC hereinafter) still shows quasi-brittle post-peak tension-softening behavior under tensile load where the load decreases with the increase of crack opening. The tensile strain capacity therefore remains low, about the same as that of normal concrete, i.e. about 0.01%. Significant efforts have been made to convert this quasi-brittle behavior of FRC to ductile strain-hardening behavior resembling ductile metal. In most instances, the approach is to increase the volume fraction of fiber as much as possible. As the fiber content exceeds a certain value, typically 4-10 vol % depending on the fiber type and interfacial properties, the conventional FRC may exhibit moderate strain-hardening behavior.

High volume fraction of fiber, however, results in considerable processing problems. Fiber dispersion becomes difficult because of high viscosity of the mix due to the presence of high surface area of the fibers and the mechanical interaction between the fibers, along with the difficulties in handling and placing. Various processing techniques have been proposed to overcome the workability problem. For example, an extrusion process was proposed to produce fiber reinforced cementitious composite with strain-hardening behavior in tension whereby more than 4% fiber by volume fraction is used while the tensile strain capacity of such extruded composites remains below 1%.

Engineered cementitious composite (ECC hereinafter), a unique class of high performance fiber-reinforced concrete, exhibits tensile strain-hardening behavior with high tensile strain capacity in exceeding of 3% with a moderate fiber content of 2 vol. % or less. ECC attains high ductility through the formation of multiple cracking with tight crack width of 60 μm. The unique tensile strain-hardening behavior of ECC results from the micromechanics-based material engineering taking into account the interaction among matrix, fibers and fiber-matrix interface. The mix maintains favorable workability and can be handled and placed like normal concrete. Few emerging applications of ECC, including lightweight building façade and pavement, make self-cleaning a desirable functionality to be added into the material.

Self-cleaning describes a smart functionality whereby the material is capable to keep its surface clean and is stainable based on the natural phenomena without involving any manual intervention. Self-cleaning can be achieved through manipulation of surface hydrophobicity or surface hydrophilicity. On the hydrophobic surface which is also known as the lotus effect, water droplets roll down with dirt particles sticking on the surface. In comparison, on a hydrophilic surface, water can easily spread out and form a thin separation layer between the surface and the dirt particles. Consequently, the dirt particles could easily be washed away by rain, for example.

Benefits of self-cleaning are two-fold. On one hand, self-cleaning reduces the needs for surface cleaning and therefore minimizes maintenance cost. On the other hand, self-cleaning keeps higher solar reflectance of the surface, i.e. cool surface, which contributes to the reduction of urban heat island, a phenomenon describing significant higher temperature in a metropolitan area as compared to the surrounding rural areas due to human activities.

Therefore, there remains a need to provide for engineered cementitious composites that possess self-cleaning capabilities.

SUMMARY

Present disclosure describes embedding or imparting self-cleaning functionality into engineered cementitious composites while maintaining their unique tensile strain-hardening behavior.

According to one aspect of the invention, there is provided a cementitious mixture for preparing a ductile self-cleaning cementitious composite. The cementitious mixture includes a hydraulic cement.

The cementitious mixture further includes water. The ratio of water to the hydraulic cement may be in a range from 0.2 to 1 by weight.

The cementitious mixture further includes a plurality of fibers. The average length of each fiber may be in a range from 4 to 30 mm. The ratio of the plurality of fibers to the hydraulic cement may be in a range from 1 to 3% by volume.

The cementitious mixture further includes a self-cleaning agent. The ratio of the self-cleaning agent to the hydraulic cement may be in a range from 0.01 to 1 by weight.

In various embodiments, the cementitious mixture includes a self-cleaning agent selected from the group consisting of nanoparticles of titanium dioxide ($TiO_2$), zinc oxide (ZnO), iron (III) oxide ($Fe_2O_3$), cadmium sulfide (CdS), zinc sulfide (ZnS), tungsten (VI) oxide ($WO_3$), copper (I) oxide ($Cu_2O$), silver phosphate ($Ag_3PO_4$), strontium titanate ($SrTiO_3$), barium titanate ($BaTiO_3$), calcium titanate ($CaTiO_3$), and a mixture thereof. In other words, one or more of the above-identified nanoparticles may be suitable.

In certain embodiments, the cementitious mixture includes a self-cleaning agent comprising $TiO_2$ nanoparticles.

In yet certain embodiments, the cementitious mixture includes a self-cleaning agent wherein the ratio of the self-cleaning agent to the hydraulic cement is in a range from 0.05 to 0.1 by weight.

In preferred embodiments, the cementitious mixture includes a self-cleaning agent wherein the self-cleaning agent comprises $TiO_2$ nanoparticles and the ratio of $TiO_2$ nanoparticles to the hydraulic cement is 0.05 or 0.1 by weight.

In various embodiments, the cementitious mixture includes a hydraulic cement selected from the group consisting of Portland cement, blended Portland cement, expansive cement, rapid setting and hardening cement, calcium aluminate cement, magnesium phosphate, and a mixture thereof. In other words, one or more of the above-listed cement may be used.

In one embodiment, the cementitious mixture includes a hydraulic cement comprising Type I white Portland cement.

In various embodiments, the cementitious mixture includes a plurality of fibers selected from a group consisting of polypropylene (PP) fibers, aromatic polyamide fibers, high modulus polyethylene (PE) fibers, polyvinyl alcohol (PVA) fibers, steel fibers, and a mixture thereof. In other words, one or more of the above-mentioned fiber materials are suitable.

In preferred embodiments, the cementitious mixture includes a plurality of PVA fibers.

In even more preferred embodiments, the cementitious mixture includes a plurality of PVA fibers, wherein the ratio of the plurality of PVA fibers to the hydraulic cement is 2% by volume.

In various embodiments, the cementitious mixture further includes a viscosity control agent. The ratio of the viscosity control agent to the hydraulic cement may be in a range from 0.001 to 0.05 by weight.

In some embodiments, the cementitious mixture includes a viscosity control agent comprising methylcellulose, polyvinyl alcohol, or starch.

In various embodiments, the cementitious mixture further comprises a water reducing agent. The ratio of the water reducing agent to the hydraulic cement may be in a range from 0.005 to 0.07 by weight.

In preferred embodiments, the cementitious mixture includes a water reducing agent comprising a polycarboxylate-based superplasticizer and the ratio of the water reducing agent to the hydraulic cement may be in a range from 0.01 to 0.05 by weight.

According to another aspect of the invention, a method of preparing the ductile self-cleaning cementitious composite of the previous aspect is described herein. The method includes mixing a hydraulic cement, water, a plurality of fibers, and a self-cleaning agent.

The ratio of water to the hydraulic cement is a range from 0.2 to 1 by weight.

The average length of each fiber is in a range from 4 to 30 mm, wherein the ratio of the plurality of fibers to the hydraulic cement is in a range from 1 to 3% by volume.

The ratio of the self-cleaning agent to the hydraulic cement is in a range from 0.01 to 1 by weight.

The method further includes curing the mixture.

The mixture preparation of present disclosure can be carried out in any type of concrete or mortar mixer, following conventional fiber-reinforced concrete mixing procedure. The fibers can either be added at the end of the mixing when a consistent matrix paste has been reached, or be premixed with dry powders to form a pre-package mortar. Since the workability and rheology can be adjusted in broad range, the fresh mixture can be pumped, cast or sprayed according to construction requirement.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural or compositional changes may be made without departing from the scope of the invention. The various embodiments are not necessarily mutually exclusive, as some embodiments can be combined with one or more other embodiments to form new embodiments.

Durability is a major concern of any self-cleaning material. Self-cleaning coating on windows, façade, or any other substrate generally needs to be re-coated every 3-5 years. One of the reasons for deterioration can be attributed to the brittleness of the coating, which has very limited resistance to cracking, chipping, and fragmentation followed by delamination and peeling of coating from the substrate.

The use of a ductile matrix, in present case the ECC, to host self-cleaning agent greatly improves the toughness and durability of the resulting self-cleaning coating. This makes engineered self-cleaning cementitious composite a potential material to apply on the surface where wearing, impact, and high stress concentration are expected during the use phase, such as the driving surfaces of pavement.

Present disclosure therefore is directed towards embedding or imparting self-cleaning functionality into ECC while maintaining their unique tensile strain-hardening behavior. The addition of one or more self-cleaning agents, such as titania (also known as titanium dioxide or $TiO_2$) particles as illustrated in various embodiments in the examples section, may alter the tensile strain hardening behavior of ECC. Systematic engineering of synergistic interaction between the self-cleaning agent(s) and other ingredients is needed to ensure both objectives, i.e. self-cleaning and tensile ductility, can be achieved. This is done through proper ingredients selection and component tailoring guided by micromechanical models to be described below.

A cementitious mixture comprising selected constituents appropriate for producing a strain-hardening cementitious composite having self-cleaning functionality and other mechanical properties suitable for structural and non-structural applications and having good workability capable of pumping, spraying and casting like normal concrete is disclosed herein. Guideline based on micromechanics consideration is also provided to select suitable matrix composition and discontinuous short fibers, wherein selection criteria are quantified by several micromechanics characteristics. The produced composite has isotropic properties.

In various embodiments, the cementitious mixture comprises a hydraulic cement, water, discontinuous (or otherwise short) fibers, and a self-cleaning agent in various proportions. Optional constituents, such as viscosity control agent and water reducing agent, may be added to the cementitious mixture to adjust the thixotropic rheology and viscosity characteristics to achieve a uniform dispersion of fibers. As will be appreciated, the selection of the mixture constituents depends on the self-cleaning performance and mechanical properties that is desired for a particular application, and the employed material process method desired.

The design of the ECC with the aforementioned advantages is based on the understanding of the mechanical interactions between the discontinuous short fibers, matrix, and interface phases, which can be quantified by micromechanics models. A fundamental requirement for a fiber-reinforced brittle matrix composite to strain-hardens in tension is that steady state cracking occurs, wherein a crack increases in length at constant ambient tensile stress $\sigma_{ss}$ while maintaining a constant crack opening $\delta_{ss}$. Marshall and Cox (*Mechanics of Materials*, V. 7, No. 8, 1988, pp. 127-133) showed that this phenomenon prevails when the condition $$J'_{tip} = \sigma_{ss}\delta_{ss} - \int_0^{\delta_{ss}} \sigma(\delta)d\delta \qquad (1)$$

is satisfied. In Eqn. (1), $J'_{tip}$ approaches the matrix toughness $K_m^2/E_m$ at small fiber content, such as less than 3% by volume. $\sigma(B)$ is the generalized stress-crack opening relationship, which describes the inelastic deformation $\delta$ at a crack face when subject to ambient stress $\sigma$. Since the maximum ambient stress is bounded by peak bridging stress $\sigma_0$, it reveals an upper limit on the matrix toughness for steady state crack propagation mode:

$$\frac{K_m^2}{E_m} \leq \sigma_o\delta_o - \int_0^{\delta_o} \sigma(\delta)d\delta \equiv J'_b \qquad (2)$$

where $\delta_0$ is the crack opening corresponding to $\sigma_0$.

In order to apply the steady state cracking condition in material design, the stress-crack opening relationship $\sigma(\delta)$ has to be correlated to micromechanics parameters of each material phase. For the case of discontinuous short fiber-reinforced cementitious composite, a comprehensive analytic $\sigma(\Gamma)$ model can be found in Li (*ASCE J. of Materials in Civil Engineering*, V. 4, No. 1, 1992, pp. 41-57) and Lin et al. (*J. Concrete Science and Engineering, RILEM*, Vol. 1, 1999, pp. 173-184). In this model, the fiber is characterized in terms of volume fraction $V_f$, fiber length $l_f$, diameter $d_f$, elastic modulus $E_f$ and tensile strength $\sigma_{fu}$. The matrix is characterized in terms of its fracture toughness $K_m$, elastic modulus $E_m$ and initial flaw size distribution $a_0$. The fiber and matrix interaction, or interface characteristics, are described by the interfacial friction $\tau_o$, chemical bond $G_d$ and slip-hardening coefficient $\beta$. Specifically, the energetics of crack propagation along fiber/matrix interface is used to quantify the debonding process and the bridging force of a fiber with given embedment length; statistics is introduced to describe the random nature of preexisting flaws and the random location and orientation of fibers.

Parameter studies based on the foregoing models produces a set of targeted micromechanics properties, which provide guidance to the selection of mixture constituents for achieving strain-hardening behavior. Assuming an upper bound of $J'_{tip}$ of 5 J/m² for a normal cement paste, and a targeted composite tensile strength of at least 3 MPa, the following ranges of fiber and interfacial properties are preferred: fiber strength at least 800 MPa, fiber diameter from 20 to 100 μm and more preferably from 30 to 60 μm, fiber modulus of elasticity from 10 to 300 GPa and more preferably from 40 to 200 GPa, and fiber length from 4 to 30 mm that is partially constrained by processing restriction; interface chemical bonding below 5.0 J/m² and more preferably below 2 J/m², interfacial friction from 0.5 to 3.0 MPa and more preferably from 0.8 to 2.0 MPa, and interface slip hardening coefficient below 3.0 and more preferably below 1.5.

All these fiber and interface properties are determinable prior to forming the composite. The interfacial properties can be characterized by single fiber pullout test as described in Katz et al. (*Journal of Materials Science Letters*, 15, 1996, pp. 1821-1823), while the fiber properties are usually found in specifications from the fiber manufacturer.

A variety of commercially available short fibers can be used herein, following the aforementioned guidance. In present context, discontinuous or short fibers refer to fibers that do not extend across the entire matrix in which the fibers are embedded. Preferably, the short fibers have length in the range of about 4 mm to about 30 mm. For example, the fiber may be about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, or about 30 mm long.

In various embodiments, the reinforcing discontinuous short fibers are selected from a group consisting of polypropylene (PP) fiber, aromatic polyamide (i.e. aramid) fiber, high modulus polyethylene (PE) fiber, polyvinyl alcohol (PVA) fiber, steel fiber, and a mixture thereof. One exemplary fiber is polyvinyl alcohol fiber K-II REC™, available through Kuraray Co. Ltd of Osaka, Japan. Its properties are listed in Table 1 here below. It is to be noted that not all commercially available fibers are suitable. For example, commonly used carbon fibers, glass fibers, and cellulose fibers are not appropriate due to its low resistance to bending.

TABLE 1

Properties of K-II-REC ™ PVA Fiber

| Nominal Strength (MPa) | Diameter (μm) | Length (mm) | Modulus of Elasticity (GPa) | Frictional Stress (MPa) | Chemical Bond (J/m²) | Slip-hardening Coefficient |
|---|---|---|---|---|---|---|
| 1620 | 39 | 12 | 42.8 | 2.0 | 2.2 | 1.2 |

While the conventional approach to achieve strain hardening in fiber-reinforced composites is to use high content of fiber typically at 4 to 20 vol %, in present disclosure a rather low volume fraction typically from 1 to 3% is needed. For the purposes of illustration but not to be construed as limiting, a 2% volume fraction of fiber is used in the examples section. The lower fiber content makes it feasible for various types of processing, including but not limited to casting, extrusion, or spraying. The lower fiber content also enhances economic feasibility for infrastructure construction applications.

The effect of photocatalysis has been known for a long time and is utilized in particular for oxidizing and/or degrading organic compounds (e.g. soiling) on substrates under sunlight or artificial light. In recent years, photocatalysts have been used to impart self-cleaning functionality into smart materials. Combined with the hydrophilicity, photocatalysts facilitate self-cleaning dramatically. In other words, photocatalysts may be suitable as self-cleaning agents for present use.

The self-cleaning agent disclosed herein imparts self-cleaning functionality to strain-hardening cementitious composites. In various embodiments, the self-cleaning agent includes but is not limited to $TiO_2$, zinc oxide (ZnO), iron (III) oxide ($Fe_2O_3$), cadmium sulfide (CdS), zinc sulfide (ZnS), tungsten (VI) oxide ($WO_3$), copper (I) oxide ($Cu_2O$), silver phosphate ($Ag_3PO_4$), strontium titanate ($SrTiO_3$), barium titanate ($BaTiO_3$), and calcium titanate ($CaTiO_3$). Other oxide semiconductor materials capable of self-cleaning are also suitable.

$TiO_2$ is the most widely used material to impart self-cleaning in many applications due to its non-toxicity and low cost. Accordingly, the following discussion relates to $TiO_2$ being employed as one example of suitable self-cleaning agent for the sake of brevity and discussion. The $TiO_2$ particles should have at least 70% of anatase to effectively engage photocatalysis. The preferred size distribution is in a range from 5 nm to 100 μm, and more preferably in a range from 25 nm to 10 μm. An illustrative $TiO_2$ particle with these desired properties is a self-cleaning agent commercially available as P25 from Degussa. The fraction of $TiO_2$ particles present in the composite is determined by the self-cleaning performance desired, providing no significant deterioration in strength; typically, up to 10% of $TiO_2$ particles in weight fraction can be included in the mixture.

In various embodiments, the ratio of self-cleaning agent to the hydraulic cement may be in a range from about 0.01 to about 1, about 0.01 to about 0.9, about 0.01 to about 0.85, about 0.01 to about 0.8, about 0.01 to about 0.75, about 0.01 to about 0.7, about 0.01 to about 0.65, about 0.01 to about 0.6, about 0.01 to about 0.55, about 0.01 to about 0.5, about 0.01 to about 0.45, about 0.01 to about 0.4, about 0.01 to about 0.35, about 0.01 to about 0.3, about 0.01 to about 0.25, about 0.01 to about 0.2, about 0.01 to about 0.15, about 0.01 to about 0.1, about 0.02 to about 0.1, about 0.03 to about 0.1, about 0.04 to about 0.1, about 0.05 to about 0.1 by weight.

The matrix of the cementitious composite is composed of a binder comprising a hydraulic cement. As used herein, the term "binder" refers to a material that is capable of attaching two or more materials to one another such that the two or more materials are held together. The term "hydraulic cement" refers to cement that sets and hardens in the presence of water. In various embodiments, the hydraulic cement binder (or hydraulic cement for brevity) is selected from the group consisting of Portland cement, blended Portland cement, expansive cement, rapid setting and hardening cement, calcium aluminate cement, magnesium phosphate, and mixtures thereof. In specific embodiments, the hydraulic cement binder comprises or consists of Type I white Portland cement.

Slag such as ground granulated blast-furnace slag (GGBS) and pozzolanic admixtures such as fly ash and silica fume can also be included in the mixture. Both economic considerations and wide acceptance in practice of civil engineering make hydraulic cement preferred for the purpose of the process of the present invention. However, there are neither theoretical nor practical considerations ruling out the use of inorganic polymers including geopolymers based on silico-aluminates, which has similar mechanical properties to Portland cement.

Water is present in the cementitious mixture, optionally in conjunction with a viscosity control agent and a water reducing agent to achieve adequate rheological properties. In various embodiments, the ratio of water to hydraulic cement may be in the range of about 0.2 to about 1 by weight, such as about 0.2 to about 0.9, about 0.3 to about 0.9, about 0.4 to about 0.9, about 0.5 to about 0.9, about 0.2 to about 0.8, about 0.3 to about 0.8, about 0.4 to about 0.8, about 0.5 to about 0.8, about 0.2 to about 0.7, about 0.3 to about 0.7, about 0.4 to about 0.7, about 0.5 to about 0.7, about 0.2 to about 0.6, about 0.3 to about 0.6, or about 0.4 to about 0.6 by weight. In specific embodiments, the ratio of water to cement may be in the range of about 0.4 to about 0.6 by weight.

As mentioned above, a viscosity control agent may be used to prevent segregation, since the $TiO_2$ particles are much heavier than hydraulic cement particles and tend to separate out from the hydraulic cement paste. At the same time, the viscosity control agent also helps to achieve better fiber dispersion in the mixture.

In various embodiments, the viscosity control agent may be methylcellulose, polyvinyl alcohol, or starch.

In various embodiments, the ratio of viscosity control agent to the hydraulic cement is not more than 0.05 by weight. For example, the ratio of viscosity control agent to the hydraulic cement may be in the range of about 0.001 to about 0.05, about 0.001 to about 0.04, about 0.001 to about 0.03, about 0.001 to about 0.02, or about 0.001 to about 0.01 by weight. In certain embodiments, the ratio of viscosity control agent to the hydraulic cement may be in the range of about 0.001 to about 0.01 by weight.

A water reducing agent may be used to adjust workability after the water content in the composite is determined, and the quantity needed varies with the water to hydraulic cement ratio, the type of self-cleaning agent and the type of water reducing agent. An illustrative water reducing agent may be a polycarboxylate-based superplasticizer available as ADVA 181 from W.R. Grace Asia Pte Ltd.

In various embodiments, the ratio of water reducing agent to the hydraulic cement may be about 0.005 to about 0.07 by weight. For example, the ratio of water reducing agent to the hydraulic cement can be about 0.005 to about 0.06, about 0.005 to about 0.05, about 0.005 to about 0.04, about 0.005 to about 0.03, about 0.01 to about 0.06, about 0.02 to about 0.06, about 0.03 to about 0.06, about 0.04 to about 0.06, or about 0.01 to about 0.05 by weight.

The mixture preparation of present disclosure can be carried out in any type of concrete or mortar mixer, following conventional FRC mixing procedure. The fibers can either be added at the end of the mixing when a consistent matrix paste has been reached, or be premixed with dry powders to form a pre-package mortar. Since the workability and rheology can be adjusted in broad range, the fresh mixture can be pumped, cast or sprayed according to construction requirement.

In order that the invention may be readily understood and put into practical effect, particular embodiments will now be described by way of the following non-limiting examples.

EXAMPLES

In the following examples, there is disclosed a cementitious mixture for preparing self-cleaning ECC including Type I white Portland cement, water, superplasticizer, $TiO_2$ particles, and short polyvinyl alcohol (PVA) fibers. The length of the short fiber is about 12 mm with a surface oiling content of 0.4%. Nano-sized $TiO_2$ particles which consist of 80% of anatase and 20% of rutile (trade name P25) were used to impart photocatalytic properties to the ECC. The particle size is approximately 21 nm with a specific surface area (BET) of 50 $m^2/g$. A polycarboxylate-based superplasticizer (ADVA 181, W.R. Grace Asia Pte Ltd) was chosen as the water reducing agent. The water to hydraulic cement ratio was kept at 0.3 by weight for all mixes as shown in the Table 2. Mix 1 was designed as the control in which no $TiO_2$ was added into the mix, while 5% and 10% of $TiO_2$ were adopted in mixes 2 and 3, respectively to study the effect of $TiO_2$ on the mechanical properties and the photodecomposition capability of the resulting engineered self-cleaning cementitious composite mixes.

TABLE 2

Mix proportions of Examples, parts by weight

| Mix | Cement ($kg/m^3$) | Water ($kg/m^3$) | Superplasticizer ($kg/m^3$) | $TiO_2$ ($kg/m^3$) | PVA (% by volume) |
|---|---|---|---|---|---|
| 1 | 1556 | 479 | 1.47 | 0 | 2 |
| 2 | 1527 | 470 | 5.00 | 76 | 2 |
| 3 | 1500 | 462 | 8.24 | 150 | 2 |

The mixture was prepared in a mortar mixer with a planetary rotating blade. The mixing started with a dry mix of white cement and P25 $TiO_2$ powder for 5 minutes by the mixer. After that, water was added followed by the addition of superplasticizer and mixed for another 3 minutes until the fresh mix achieved required consistency. Lastly, the PVA fibers were added slowly into the mixture and the mixing was continued for several minutes. This was to ensure good fiber dispersion and to reduce fiber clumps in the mixture. The fresh mixture was cast into cube (50 mm by 50 mm by 50 mm) and coupon (300 mm by 75 mm by 10 mm) molds and covered with plastic sheets. Specimens were demolded after one day and cured in the laboratory air (25° C., 65% RH) for another 27 days before carrying out the following tests to determine the mechanical properties, self-cleaning property and microstructure of the resulting material.

The compressive test was carried out in accordance with ASTM C109/109M to determine the compressive strength of the cube specimens at the age of 28 days. The test was carried out under load control with a loading rate of 25 kN/min. At least three samples were tested for each formulation. The flexural behavior was determined by the four point bending test on the coupon specimens at the age of 28 days with a supporting span of 240 mm and a loading span of 80 mm. The rate of deflection at the loading points was controlled at 0.3 mm/min. At least six samples were tested for each mix. Modulus of rupture (MOR) was calculated. Strain capacity was inversely calculated from the load-deflection curve according to the work by Qian and Li (*J Adv Concr Techn* 2007, 5(2), 235-246).

The self-cleaning property was examined via photodecomposition of Rhodamine B (RhB) under artificial UV or direct sunlight exposure. Rhodamine B solution with a concentration of 0.05 g/L was prepared by dissolving 1.5 mg of RhB powder in 30 ml of distilled water. The RhB solution was then applied to the circumscribed zone on the surface of specimens evenly. The area of circumscribed zone that dyed with RhB solution was around 20 $cm^2$. In the first test, the dyed specimens were placed into a chamber, which consists of a 9 W UV-A lamp (FPX9BLB) with a main wavelength of 365 nm for irradiation. The distance from the lamp to the sample was kept at 10 cm. In the second test, the dyed specimens were placed under direct sunlight for irradiation. A 900 UV/Vis/NIR spectrophotometer was used to quantitatively examine the efficiency of photodecomposition of the sample by measuring the light reflectance from the sample surface at different wavelength.

Figure 1:
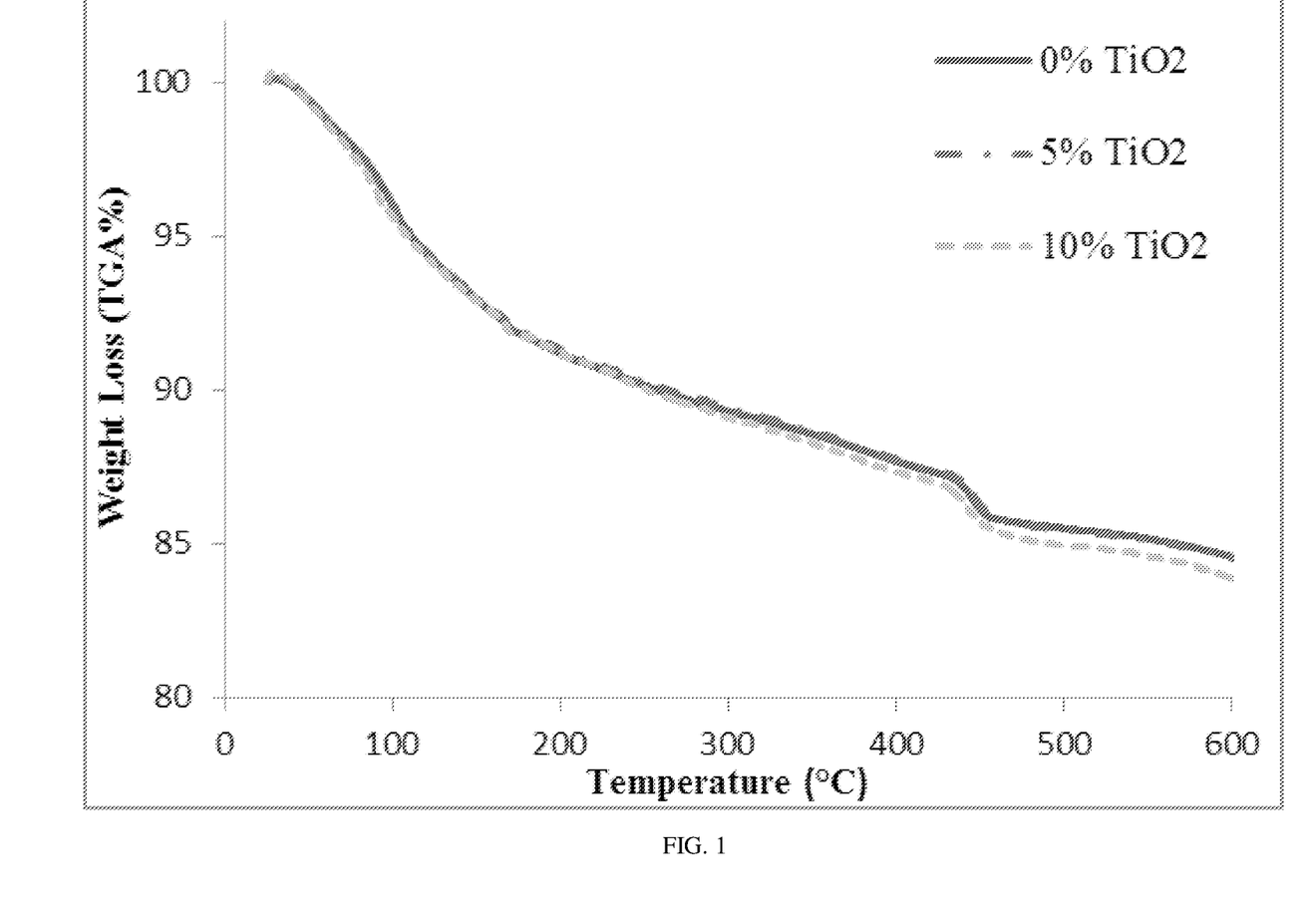
FIG. 1 shows thermogravimetric analysis (TGA) of titanium dioxide ($TiO_2$) containing engineered cementitious composites ($TiO_2$-ECC) according to the examples.

It has been reported that $TiO_2$ (P25) shows no pozzolanic reaction with cement (Chen et al. *Cement and Concrete Composites*, 2012, 34, 642-649). FIG. 1 shows the thermal gravimetric analysis of $TiO_2$-ECC at the age of 28 days. The mass loss from room temperature to 400° C. is attributed to the loss of physically adsorbed and chemically bound water on the C—S—H and the ettringite. The weight loss at about 450° C. is associated to the decomposition of $Ca(OH)_2$ (Chakraborty et al., *Ind. Eng. Chem. Res.*, 2013, 52, 1252-1260). As can be seen, the addition of $TiO_2$ does not cause any significant change on the types and amount of hydration products, which indicates that $TiO_2$ should be considered as fillers to the cement matrix.

Table 3 summarizes the compressive strength of $TiO_2$-ECC. As can be seen, the compressive strength of $TiO_2$-ECC reduces with increase of $TiO_2$ content. A 12% compressive strength reduction was observed when 10% $TiO_2$ was added to the ECC matrix. This may be attributed to the flocculation of nano $TiO_2$ particles which introduces weak zone as flaws and leads to the reduction in the compressive strength when high dosage of $TiO_2$ is added into ECC mixture.

TABLE 3

Compressive strength of $TiO_2$-ECC

| Mix No. | 1 (0% $TiO_2$) | 2 (5% $TiO_2$) | 3 (10% $TiO_2$) |
|---|---|---|---|
| Compressive strength (MPa) | 66.53 ± 4.47 | 60.05 ± 3.06 | 58.49 ± 3.83 |

Figure 2:
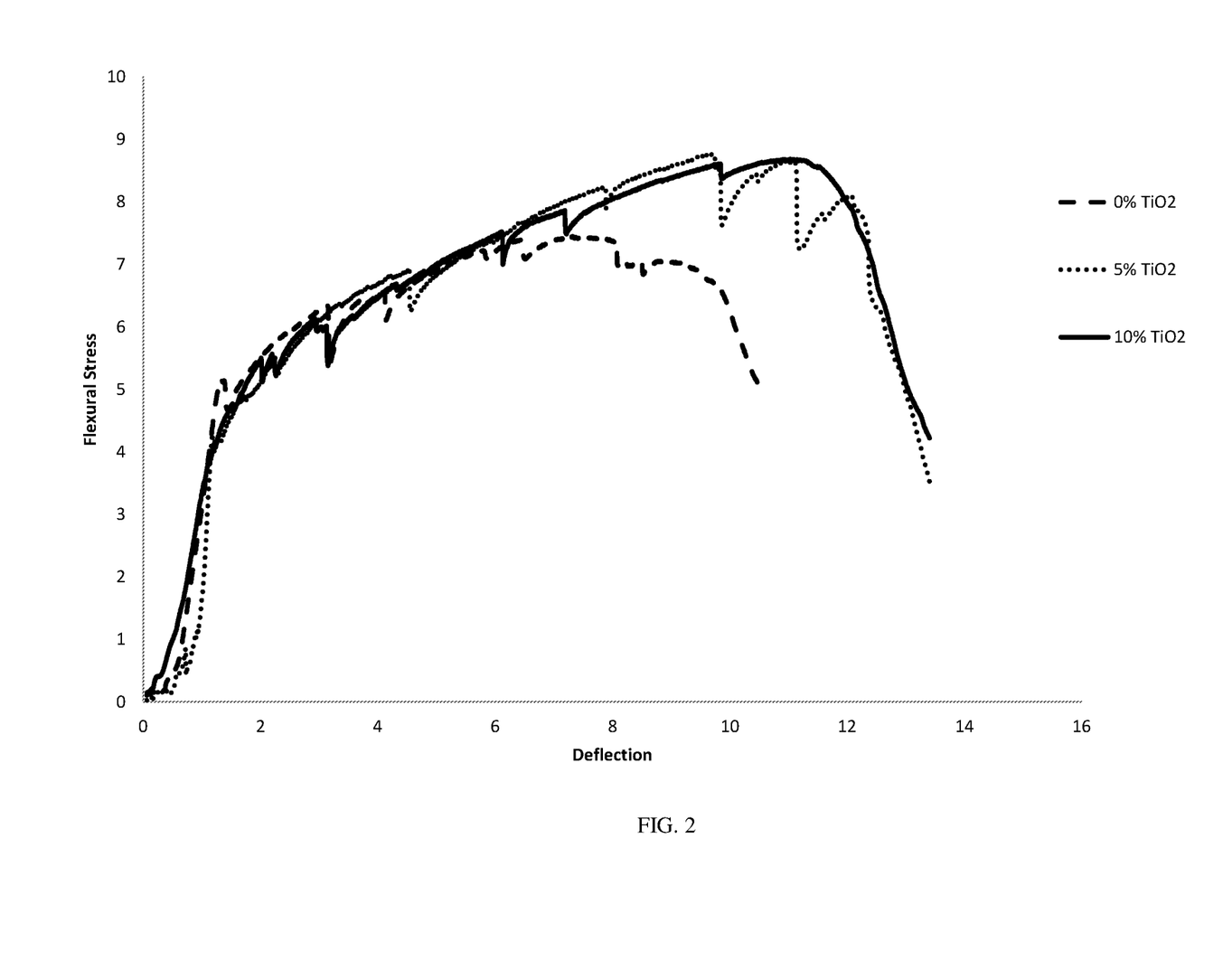
FIG. 2 shows flexural stress-deflection curves of $TiO_2$-ECCs according to the examples.

Typical flexural stress-deflection curves of $TiO_2$-ECC are shown in FIG. 2. As can be seen, all samples exhibit deflection-hardening behavior with a tensile ductility above 1% (inversely calculated from the load-deflection curve). The addition of $TiO_2$ improves the tensile ductility and the flexural strength of the resulting ECC. This can be understood by the micromechanics theory of ECC design. The fundamental requirement for ECC tensile strain-hardening is that steady-state crack propagation prevailed under tension, which requires the matrix toughness $J_{tip}$ to be less than the complementary energy $J'_b$ of the fiber bridging. In addition, matrix cracking strength $\sigma_c$ needs to be less than the bridging strength $\sigma_o$ to ensure multiple cracking. The addition of high dosage $TiO_2$ not only reduces matrix toughness $J_{tip}$ but also lowers matrix cracking strength $\sigma_c$ as evidenced by the lowered compressive strength. Both favorite the steady-state crack propagation and therefore multiple cracking and tensile strain-hardening in $TiO_2$-ECC prevails.

Figure 3:
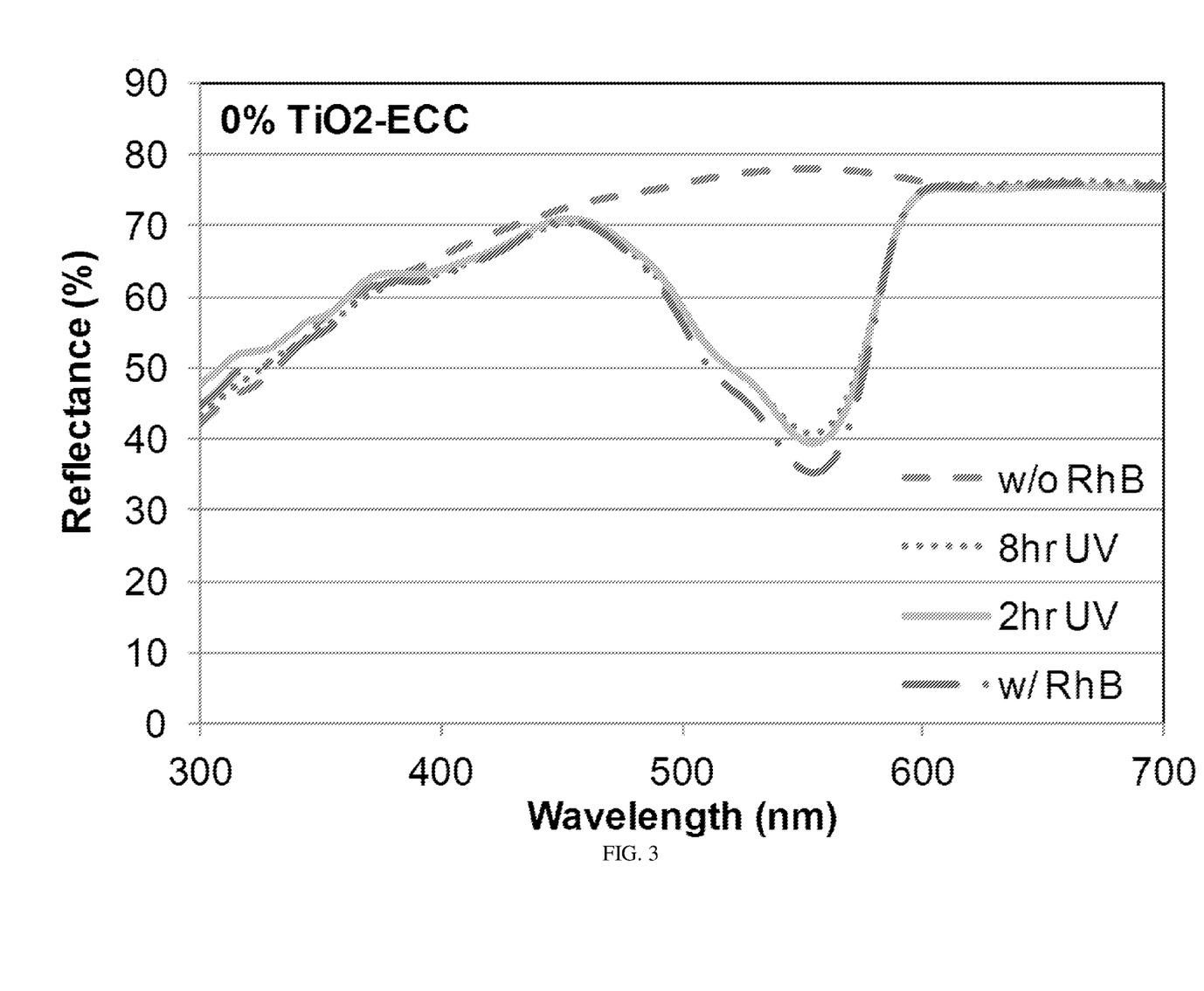
FIG. 3 shows reflectance of 0% $TiO_2$-ECC (without the addition of $TiO_2$) according to the examples.
Figure 4:
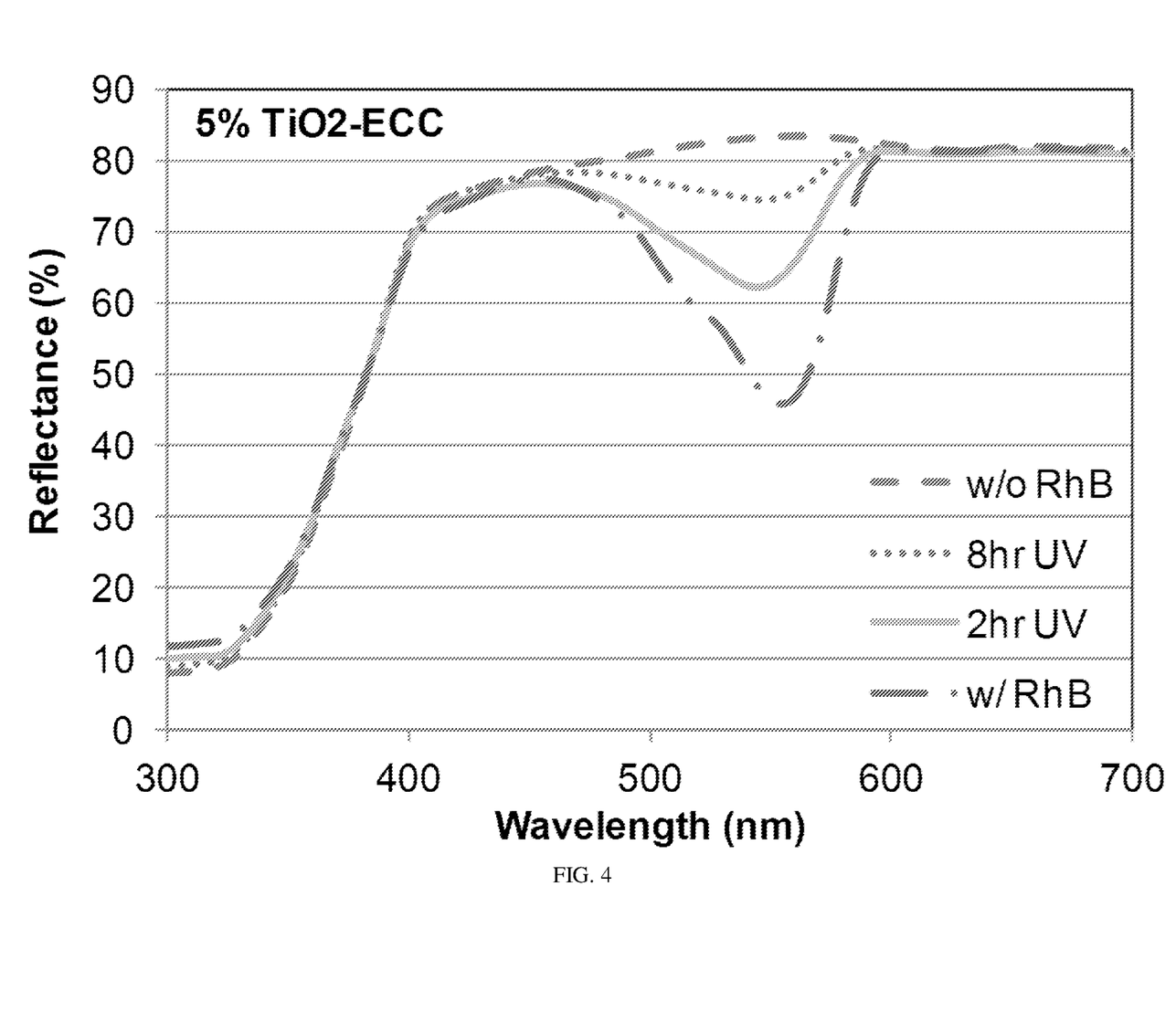
FIG. 4 shows reflectance of 5% $TiO_2$-ECC (with the addition of 5% $TiO_2$) according to the examples.
Figure 5:
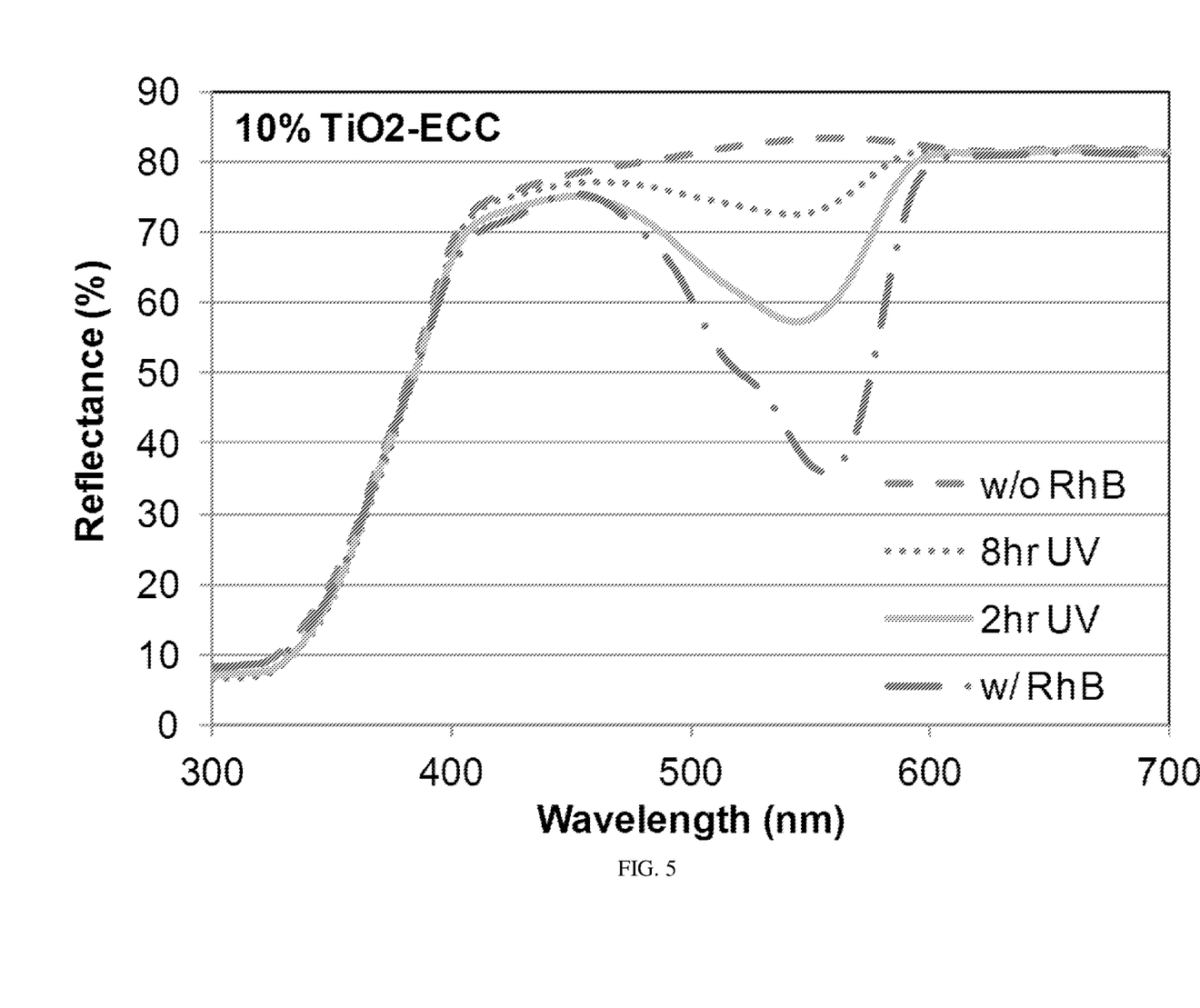
FIG. 5 shows reflectance of 10% $TiO_2$-ECC (with the addition of 10% $TiO_2$) according to the examples.

The self-cleaning effect is examined through the observation of the RhB degradation on the sample surface after UV exposure. The self-cleaning performance of $TiO_2$-ECC is quantitatively determined by light reflectance at wavelength from 300 nm to 700 nm as shown in FIGS. 3-5. The reflectance of sample surface was measured before and after application of the RhB solution and after 2 hours and 8 hours of artificial UV exposures. As can be seen, slightly higher reflectance is observed in the virgin (w/o RhB) 5% and 10% $TiO_2$-ECCs than that of 0% $TiO_2$-ECC due to the inclusion of $TiO_2$ which itself is a very good white pigment with very high reflectivity. Secondly, samples with $TiO_2$ addition show different reflection spectrum with a very weak reflection at wavelength below 400 nm as compared to that of the 0% $TiO_2$-ECC samples. The UV-absorption property is a natural attribute of $TiO_2$, which can be explained by the solid band theory. $TiO_2$ is a kind of semiconductor oxide with a large bandgap between its low-energy valence band and its high-energy conduction band. P25 has bandgap around 3.2 eV, so that P25 shows a characteristic spectrum with the stopping absorption edge at 400 nm. Therefore, the weak light reflectance at the wavelength below 400 nm is expected.

After applying RhB on the sample surface (w/RhB), significant reflectance reduction was observed in the wavelength between 450 nm to 600 nm and peaks at 555 nm corresponding to the absorption spectrum of the pink color RhB. ECC samples with $TiO_2$ inclusion exhibit strong reflectance recovery after 2 hours and 8 hours UV irradiation as shown in FIGS. 3-5.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

REFERENCES

[1] Akiba, N.; Hayakawa, I.; Keh, E. S.; Watanabe, A. antifungal effect of a tissue conditioner coating agent with TiO2 photocatalyst, J Med Dent Sci 2005; 52:223-227
[2] Arockiadoss, T., Green cement for sustainable construction, U.S. Pat. No. 8,317,917 B2 (2002)
[3] Awadalla, A., Mohd Zain, M. F., Kadhum, A. H. and Abdalla, Z. International Journal of the Physical Sciences Vol. 6(29), pp. 6767-6774, 16 Nov., 2011
[4] Cassar, L., Pepe, C., Pimpinelli, N., Tognon, G., Guerrini, G. L. and Amadelli, R. Proceedings of the 11th International Congress on the Chemistry of Cement in 2003
[5] Chakraborty S, Kundu S P, Roy A, Adhikari B, Majumder S B. Effect of Jute as Fiber Reinforcement Controlling the Hydration Characteristics of Cement Matrix. Ind. Eng. Chem. Res., 2013, 52, 1252-1260
[6] Chen et al. Cement and Concrete Composites 34 (2012) 642-649
[7] Chen J, Kou S C, Poon C S. Hydration and properties of nano-TiO2 blended cement composites. Cement and Concrete Composites 34 (2012) 642-649
[8] Feng D C, Xie N, Gong C W, Leng Z, Xiao H G, Li H. Portland Cement Paste Modified by TiO2 Nanoparticles: A Microstructure Perspective. Ind. Eng. Chem. Res., 2013, 52, 11575-11582
[9] Folli A, Jakobsen U H, Guerrini G L, Macphee D E. Rhodamine B Discolouration on TiO2 in the Cement Environment: A Look at Fundamental Aspects of the Self-cleaning Effect in Concretes, J. Adv. Oxid. Technol. Vol. 12, No. 1, 2009, 127-133
[10] Folli, A., Macphee. D. E. 8th fib PhD Symposium in Kgs. Lyngby, Denmark, Jun. 20-23, 2010
[11] Gensler, R.; Kapitza, H.; Zeininger, H.; Self-cleaning surface coating (photocatalysis) U.S. Pat. No. 8,367,579 B2 (2013)
[12] Han, Y. K., Photocatalyst building outer wall with antifouling and self-cleaning functions, CN102776993 A (2011)
[13] Katz, A. and Li, V. C., "A Special Technique for Determining the Bond Strength of Carbon Fibers in Cement Matrix by Pullout Test," Journal of Materials Science Letters, 15, 1996, pp. 1821-1823
[14] Li, V. C. "Post-Crack Scaling Relations for Fiber-Reinforced Cementitious Composites," ASCE J. of Materials in Civil Engineering, V. 4, No. 1, 1992, pp. 41-57.
[15] Li, V. C., "Engineered Cementitious Composites—Tailored Composites Through Micromechanical Modeling," in Fiber Reinforced Concrete: Present and the Future edited by N. Banthia, A. Bentur, A. and A. Mufti, Canadian Society for Civil Engineering, Montreal, 1998, pp. 64-97.
[16] Li, V. C.; Wang, S.; and Wu, C., "Tensile Strain-Hardening Behavior of PVA-ECC", ACI J. of Materials, Vol. 98, No. 6, November-December, 2001, pp 483-492.
[17] Li, V. C.; Wu, C., Wang, S., A. Ogawa, and T. Saito, "Interface tailoring for Strain-Hardening PVA-ECC", Accepted, ACI J. of Materials, 2002.

[18] Li, V. C.; Wu, H. C., "Conditions for Pseudo Strain-Hardening in Fiber Reinforced Brittle Matrix Composites", J. Applied Mechanics Review, V. 45, No. 8, August, 1992, pp. 390-398.

[19] Lin, Z.; Kanda, T.; and Li, V. C., "On Interface Property Characterization and Performance of Fiber Reinforced Cementitious Composites," J. Concrete Science and Engineering, RILEM, Vol. 1, 1999, pp. 173-184.

[20] Marshall, D. and Cox, B. N., "A J-integral Method For Calculating Steady-State Matrix Cracking Stress In Composites," Mechanics of Materials, V. 7, No. 8, 1988, pp. 127-133

[21] Nazari A, Riahi Sh, Shamekhi R F, Khademno A. Assessment of the effects of the cement paste composite in presence TiO2 nanoparticles. Journal of American Science 2010, 6(4)

[22] Qian S, Li V C. Simplified inverse method for determining the tensile strain capacity of strain hardening cementitious composites. J Adv Concr Techn 2007; 5(2): 235-246

[23] Ramida R, Sitthisuntorn S. Visible-light-sensitive N-doped TiO2 photocatalysts prepared by a mechanochemical method: effect of a nitrogen source. Research on Chemical Intermediates. 2009, Vol. 35 Issue 3, p 263-269

[24] Yu C M, Method for preparing mesoporous TiO2 thin films with high photocatalytic and antibacterial activities, U.S. Pat. No. 6,803,077 B2 (2002)

The invention claimed is:

1. A cementitious mixture for preparing a ductile self-cleaning cementitious composite, the cementitious mixture comprising:
a hydraulic cement;
water, wherein the ratio of water to the hydraulic cement is a range from 0.2 to 1 by weight;
a plurality of fibers comprising polyvinyl alcohol (PVA) fibers, wherein the average length of each fiber is in a range from 4 to 30 mm, wherein the ratio of the plurality of fibers to the hydraulic cement is in a range from 1.5 to 3% by volume; and
a self-cleaning agent, wherein the ratio of the self-cleaning agent to the hydraulic cement is in a range from 0.01 to 1 by weight.

2. The cementitious mixture of claim 1, wherein the self-cleaning agent is selected from the group consisting of nanoparticles of titanium dioxide ($TiO_2$), zinc oxide (ZnO), iron (III) oxide ($Fe_2O_3$), cadmium sulfide (CdS), zinc sulfide (ZnS), tungsten (VI) oxide ($WO_3$), copper (I) oxide ($Cu_2O$), silver phosphate ($Ag_3PO_4$), strontium titanate ($SrTiO_3$), barium titanate ($BaTiO_3$), calcium titanate ($CaTiO_3$), and a mixture thereof.

3. The cementitious mixture of claim 1, wherein the ratio of the self-cleaning agent to the hydraulic cement is in a range from 0.05 to 0.1 by weight.

4. The cementitious mixture of claim 1, wherein the hydraulic cement is selected from the group consisting of Portland cement, blended Portland cement, expansive cement, rapid setting and hardening cement, calcium aluminate cement, magnesium phosphate, and a mixture thereof.

5. The cementitious mixture of claim 1, wherein the plurality of fibers further comprise polypropylene (PP) fibers, aromatic polyamide fibers, high modulus polyethylene (PE) fibers, steel fibers, or a mixture thereof.

6. The cementitious mixture of claim 1, wherein the ratio of the PVA fibers to the hydraulic cement is 2% by volume.

7. The cementitious mixture of claim 1, further comprising a viscosity control agent, wherein the ratio of viscosity control agent to the hydraulic cement is in a range from 0.001 to 0.05 by weight.

8. The cementitious mixture of claim 1, further comprising a water reducing agent, wherein the ratio of water reducing agent to the hydraulic cement is in a range from 0.005 to 0.07 by weight.

9. The cementitious mixture of claim 8, wherein the water reducing agent comprises a polycarboxylate-based superplasticizer and the ratio of the water reducing agent to the hydraulic cement is in a range from 0.01 to 0.05 by weight.

10. The cementitious mixture of claim 1, wherein the self-cleaning agent comprises $TiO_2$ nanoparticles in an amount ranging from more than 0 wt % and up to 10 wt % of the cementitious mixture, wherein the $TiO_2$ nanoparticles comprise at least 70% anatase $TiO_2$.

11. A method of preparing a ductile self-cleaning cementitious composite, the method comprising:
mixing a hydraulic cement, water, wherein the ratio of water to the hydraulic cement is a range from 0.2 to 1 by weight; a plurality of fibers comprising polyvinyl alcohol (PVA) fibers, wherein the average length of each fiber is in a range from 4 to 30 mm, wherein the ratio of the plurality of fibers to the hydraulic cement is in a range from 1.5 to 3% by volume; and a self-cleaning agent, wherein the ratio of the self-cleaning agent to the hydraulic cement is in a range from 0.01 to 1 by weight; and
curing the mixture.

12. The method of claim 11, wherein the self-cleaning agent is selected from the group consisting of nanoparticles of titanium dioxide ($TiO_2$), zinc oxide (ZnO), iron (III) oxide ($Fe_2O_3$), cadmium sulfide (CdS), zinc sulfide (ZnS), tungsten (VI) oxide ($WO_3$), copper (I) oxide ($Cu_2O$), silver phosphate ($Ag_3PO_4$), strontium titanate ($SrTiO_3$), barium titanate ($BaTiO_3$), calcium titanate ($CaTiO_3$), and a mixture thereof.

13. The method of claim 11, wherein the ratio of the self-cleaning agent to the hydraulic cement is in a range from 0.05 to 0.1 by weight.

14. The method of claim 11, wherein the hydraulic cement is selected from the group consisting of Portland cement, blended Portland cement, expansive cement, rapid setting and hardening cement, calcium aluminate cement, magnesium phosphate, and a mixture thereof.

15. The method of claim 11, wherein the plurality of fibers further comprise polypropylene (PP) fibers, aromatic polyamide fibers, high modulus polyethylene (PE) fibers, steel fibers, or a mixture thereof.

16. The method of claim 11, wherein the ratio of the PVA fibers to the hydraulic cement is 2% by volume.

17. The method of claim 11, further comprising a viscosity control agent, wherein the ratio of viscosity control agent to the hydraulic cement is in a range from 0.001 to 0.05 by weight.

18. The method of claim 11, further comprising a water reducing agent, wherein the ratio of water reducing agent to the hydraulic cement is in a range from 0.005 to 0.07 by weight.

19. The method of claim 18, wherein the water reducing agent comprises a polycarboxylate-based superplasticizer and the ratio of the water reducing agent to the hydraulic cement is in a range from 0.01 to 0.05 by weight.

20. The method of claim 11, wherein the self-cleaning agent comprises $TiO_2$ nanoparticles in an amount ranging from more than 0 wt % and up to 10 wt % of the cementitious mixture, wherein the $TiO_2$ nanoparticles comprise at least 70% anatase $TiO_2$.

\* \* \* \* \*